(12) United States Patent
Inubushi et al.

(10) Patent No.: US 12,458,578 B2
(45) Date of Patent: Nov. 4, 2025

(54) COMPOSITION FOR INHIBITING PLAQUE FORMATION

(71) Applicant: SUNSTAR SUISSE SA, Etoy (CH)

(72) Inventors: Junya Inubushi, Osaka (JP); Keisuke Nishimura, Osaka (JP)

(73) Assignee: SUNSTAR SUISSE SA, Etoy (CH)

( * ) Notice: Subject to any disclaimer, the term of this patent is extended or adjusted under 35 U.S.C. 154(b) by 355 days.

(21) Appl. No.: 18/027,554

(22) PCT Filed: Sep. 30, 2021

(86) PCT No.: PCT/JP2021/036034
§ 371 (c)(1),
(2) Date: Mar. 21, 2023

(87) PCT Pub. No.: WO2022/071457
PCT Pub. Date: Apr. 7, 2022

(65) Prior Publication Data
US 2023/0372220 A1   Nov. 23, 2023

(30) Foreign Application Priority Data

Sep. 30, 2020 (JP) ................. 2020-166440
Sep. 30, 2020 (JP) ................. 2020-166479

(51) Int. Cl.
*A61K 8/41* (2006.01)
*A61K 8/49* (2006.01)
*A61Q 11/00* (2006.01)

(52) U.S. Cl.
CPC ............ *A61K 8/4926* (2013.01); *A61K 8/416* (2013.01); *A61Q 11/00* (2013.01)

(58) Field of Classification Search
None
See application file for complete search history.

(56) References Cited

U.S. PATENT DOCUMENTS

| 4,022,880 | A | * | 5/1977 | Vinson | ............... | A61K 8/43 424/49 |
| 4,472,373 | A | | 9/1984 | Ryan | | |
| 5,961,958 | A | * | 10/1999 | Homola | ............... | A61K 8/41 106/35 |
| 2005/0255072 | A1 | | 11/2005 | Jampani et al. | | |
| 2007/0237726 | A1 | | 10/2007 | White et al. | | |
| 2010/0240714 | A1 | | 9/2010 | Yoshida et al. | | |
| 2016/0324748 | A1 | | 11/2016 | Ogihara et al. | | |

FOREIGN PATENT DOCUMENTS

| CN | 101534785 A | 9/2009 |
| CN | 105792809 A | 7/2016 |
| JP | H11-049625 A | 2/1999 |
| JP | 2000 256155 | * 9/2000 ............ A61Q 11/00 |
| JP | 2000-256155 A | 9/2000 |
| JP | 2004-501942 A | 1/2004 |
| JP | 2005-117926 A | 5/2005 |
| JP | 2011-148770 A | 8/2011 |
| JP | 2015-521604 A | 7/2015 |
| WO | WO 02/02061 A2 | 1/2002 |
| WO | WO 2010/019680 A1 | 2/2010 |
| WO | WO 2011/094613 A1 | 8/2011 |
| WO | WO 2013/192382 A2 | 12/2013 |
| WO | WO 2016/179561 A1 | 11/2016 |

OTHER PUBLICATIONS

Compendium of Industrial Chemical Auxiliaries, Feb. 28, 1990, pp. 34-35, vol. 1, Institute of Scientific and Technical Information, Chemical Industry Department (see the Chinese Office Action below for concise relevance).
Jul. 18, 2024, Chinese Office Action issued for related CN Application No. 202180067119.9.
Tanzer et al., In Vitro Evaluation of Seven Cationic Detergents as Antiplaque Agents, Antimicrobial Agents and Chemotherapy, Mar. 1979, pp. 408-414, vol. 15, No. 3.
Schwarz et al., Limited antimicrobial efficacy of oral care antiseptics in microcosm biofilms and phenotypic adaptation of bacteria upon repeated exposure, Clinical Oral Investigations, Oct. 8, 2020, pp. 2939-2950, vol. 25.
Liu et al., Cetylpyridinium chloride suppresses gene expression associated with halitosis, Archives of Oral Biology, Nov. 2013, pp. 1686-1691, vol. 58, Issue 11.
Pereira et al., Benzalkonium Chlorides: Uses, Regulatory Status, and Microbial Resistance, Applied and Environmental Microbiology, Jul. 2019, pp. 1-13, vol. 85, Issue 13, e00377-19.
Nobbs et al., Stick to Your Gums: Mechanisms of Oral Microbial Adherence, Journal of Dental Research, 2011, pp. 1271-1278, vol. 90, No. 11.
Aug. 24, 2021, Japanese Office Action issued for related JP Application No. 2020-166440.
Dec. 7, 2021, English Translation of International Search Report issued for related PCT Application No. PCT/JP2021/036034.
Bonesvoll et al., A Comparison Between Chlorhexidine and Some Quaternary Ammonium Compounds With Regard to Retention, Salivary Concentration and Plaque-Inhibiting Effect in the Human Mouth After Mouth Rinses, Archives of Oral Biology, Jan. 1, 1978, pp. 289-294, vol. 23, No. 4.
Oct. 16, 2024, European Search Report issued for related EP Application No. 21875753.2.

* cited by examiner

*Primary Examiner* — Brian Gulledge
(74) *Attorney, Agent, or Firm* — Paratus Law Group, PLLC

(57) ABSTRACT

Provided is a technique for inhibiting plaque formation or plaque maturation on the tooth surface. More specifically, provided is a composition for inhibiting plaque formation containing a quaternary ammonium salt having a C10 to C14 alkyl group and preferably further containing cetylpyridinium chloride.

4 Claims, 9 Drawing Sheets

COMPOSITION FOR INHIBITING PLAQUE FORMATION

CROSS REFERENCE TO PRIOR APPLICATION

This application is a National Stage Patent Application of PCT International Patent Application No. PCT/JP2021/036034 (filed on Sep. 30, 2021) under 35 U.S.C. § 371, which claims priority to Japanese Patent Application Nos. 2020-166440 (filed on Sep. 30, 2020) and 2020-166479 (filed on Sep. 30, 2020), which are all hereby incorporated by reference in their entirety.

TECHNICAL FIELD

The present disclosure relates to, for example, a composition for inhibiting plaque (dental plague) formation. The contents of all of the documents disclosed in the present specification are incorporated herein by reference.

BACKGROUND ART

Plaque (dental plaque) is a biofilm of aggregated oral microorganisms and is considered to be a potential cause of dental caries and periodontal disease. Plaque control, in particular, inhibiting plaque formation, is thus important.

Briefly, plague is formed as follows. Specifically, a thin film of protein derived from saliva or physiological gingival crevicular fluid, called "pellicle," is first formed on the tooth surface, and through the pellicle, facultative anaerobic bacteria (early adherent bacteria), such as streptococci, adhere to the tooth surface. Then, to the early adherent bacteria, bridge bacteria such as Fusobacterium, which coaggregate with various oral bacteria, adhere, and additionally, late adherent bacteria, such as *Porphyromonas gingivalis* and *Treponema denticola*, which are anaerobic bacteria, adhere and aggregate via the bridge bacteria, whereby plague matures. In particular, late adherent bacteria are known to cause periodontal disease and known to be directly and indirectly involved in the destruction of periodontal tissue.

CITATION LIST

Non-Patent Literature

NPL 1: J Dent. Res 90(11):1271-1278, 2011

SUMMARY OF INVENTION

Technical Problem

In view of the above, inhibiting the formation of plaque on the tooth surface, in particular, inhibiting the adhesion and aggregation of late adherent bacteria, and the maturation of plaque, is important for the prevention of periodontal disease.

Solution to Problem

The present inventors focused on Fusobacterium, i.e., bridge bacteria, and conducted research. This is because it is believed that if inhibition of the action of Fusobacterium, i.e., bridge bacteria, capable of coaggregating with various bacteria is possible, then inhibition of the adhesion and aggregation of late adherent bacteria on the tooth surface is possible, which in turn will make it possible to inhibit the maturation of plaque formation.

Accordingly, the inventors continued to study techniques for sterilizing Fusobacterium. However, although various sterilizers typically used for oral compositions were studied, no sterilizers capable of efficiently sterilizing Fusobacterium could be found.

Cetylpyridinium chloride, an example of a sterilizer typically used for oral compositions, was no exception, and an efficient sterilization effect on Fusobacterium was not observed. However, the inventors conducted further study. Cetylpyridinium chloride is a C16 alkylpyridinium chloride, and the inventors found the possibility that the alkyl length thereof affects the sterilization effect on Fusobacterium. The inventors then conducted further modification.

The present disclosure encompasses, for example, the subject matter described in the following Items.

Item 1
 A composition for inhibiting plaque formation comprising a quaternary ammonium salt having a C10 to C14 alkyl group.

Item 2
 A composition for inhibiting plaque formation comprising a quaternary ammonium salt having a C10 to C14 alkyl group and cetylpyridinium chloride.

Item 3
 The composition according to Item 1 or 2, wherein
  the quaternary ammonium salt having a C10 to C14 alkyl group is at least one member selected from the group consisting of a compound represented by formula (1):

wherein R represents a C10 to C14 linear alkyl group, and X represents Cl or Br, and
a compound represented by formula (2):

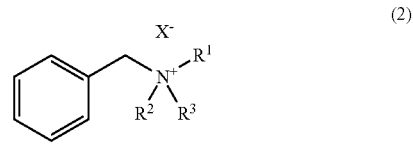

wherein $R^1$ represents a C10 to C14 linear alkyl group, $R^2$ and $R^3$ are identical or different, and each represents a C1 to C4 alkyl group, and X represents Cl or Br.

Item 4
 The composition according to Item 3,
 wherein the quaternary ammonium salt having a C10 to C14 alkyl group is at least one member selected from the group consisting of a compound represented by formula (1a):

wherein R is as defined above, and
a compound represented by formula (2a):

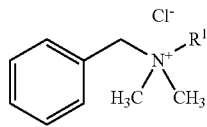
(2a)

wherein $R^1$ is as defined above.

Item 5

An enhancer for enhancing a plaque formation inhibitory effect of a quaternary ammonium salt having a C10 to C14 alkyl group, the enhancer comprising cetylpyridinium chloride.

Item 6.

The enhancer for enhancing a plaque formation inhibitory effect according to Item 5,
wherein the quaternary ammonium salt having a C10 to C14 alkyl group is at least one member selected from the group consisting of a compound represented by formula (1):

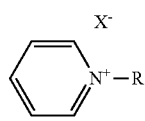
(1)

wherein R represents a C10 to C14 linear alkyl group, and X represents Cl or Br, and a compound represented by formula (2):

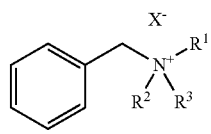
(2)

wherein $R^1$ represents a C10 to C14 linear alkyl group, $R^2$ and $R^3$ are identical or different, and each represents a C1 to C4 alkyl group, and X represents Cl or Br.

Item 7

The enhancer for enhancing a plaque formation inhibitory effect according to Item 6,
wherein the quaternary ammonium salt having a C10 to C14 alkyl group is at least one member selected from the group consisting of a compound represented by formula (1a):

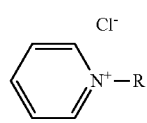
(1a)

wherein R is as defined above, and
a compound represented by formula (2a):

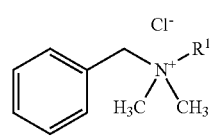
(2a)

wherein $R^1$ is as defined above.

Item 8

An enhancer for enhancing a Fusobacterium sterilization effect of a quaternary ammonium salt having a C10 to C14 alkyl group, the enhancer comprising cetylpyridinium chloride.

Item 9

The enhancer for enhancing a Fusobacterium sterilization effect according to Item 8,
wherein the quaternary ammonium salt having a C10 to C14 alkyl group is at least one member selected from the group consisting of a compound represented by formula (1):

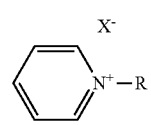
(1)

wherein R represents a C10 to C14 linear alkyl group, and X represents Cl or Br, and
a compound represented by formula (2):

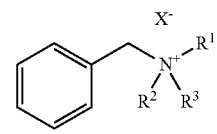
(2)

wherein $R^1$ represents a C10 to C14 linear alkyl group, $R^2$ and $R^3$ are identical or different, and each represents a C1 to C4 alkyl group, and X represents Cl or Br.

Item 10

The enhancer for enhancing a Fusobacterium sterilization effect according to item 9, wherein the quaternary ammonium salt having a C10 to C14 alkyl group is at least one member selected from the group consisting of a compound represented by formula (1a):

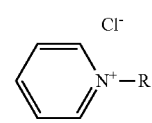
(1a)

wherein R is as defined above, and
a compound represented by formula (2a):

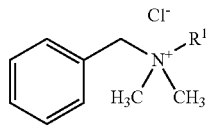

(2a)

wherein $R^1$ is as defined above.

Advantageous Effects of Invention

Provided is a technique for efficiently sterilizing Fusobacterium, i.e., bridge bacteria in plaque formation. This also allows for efficient inhibition of plaque formation.

DESCRIPTION OF EMBODIMENTS

Figure 1:
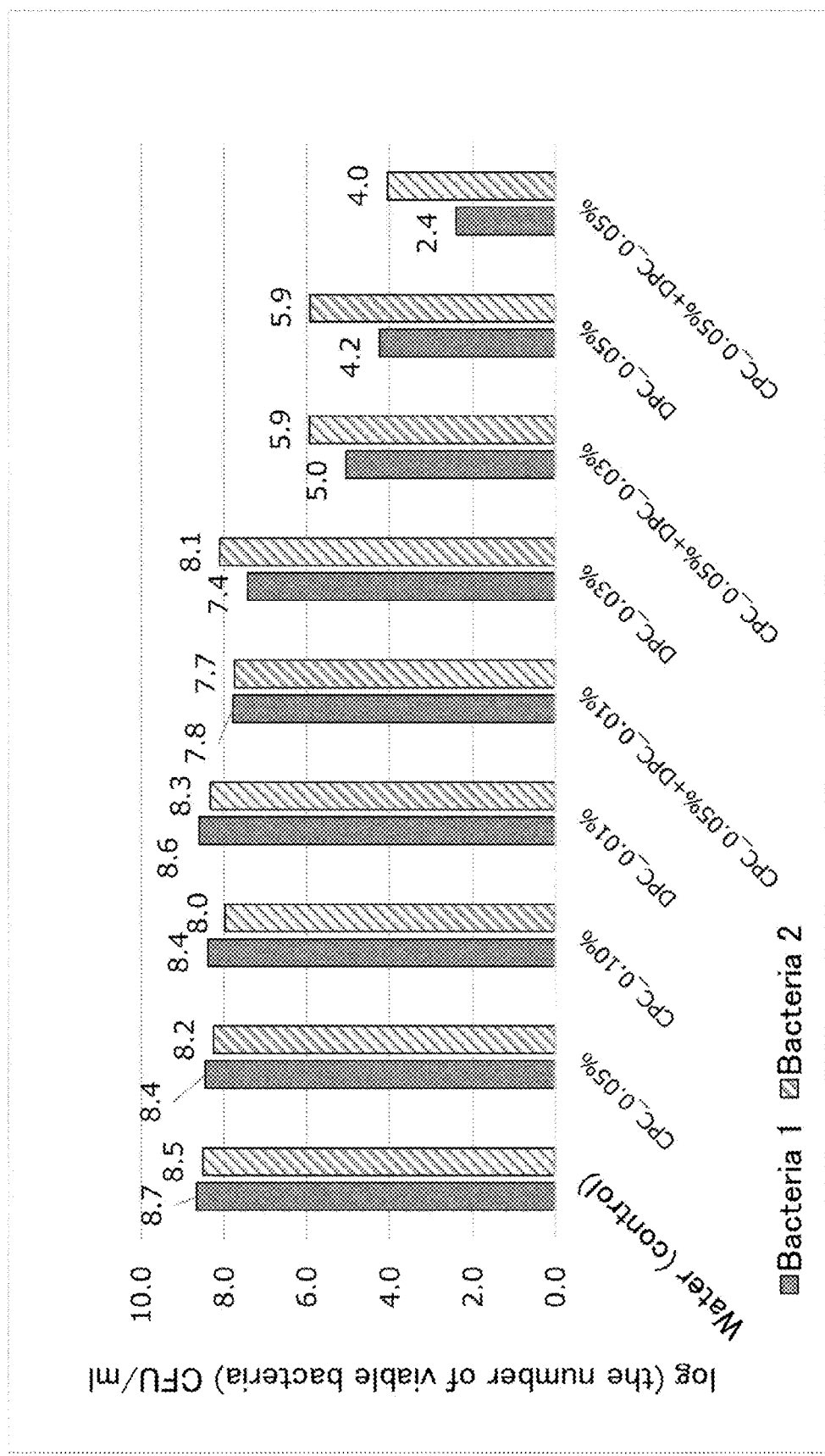
FIG. 1 is a graph showing study results of the sterilization effect of a quaternary ammonium salt having a C10 to C14 alkyl group (CPC and/or DPC) on Fusobacterium.

Embodiments encompassed by the present disclosure are described in more detail below. The present disclosure preferably encompasses, for example, a composition for inhibiting plaque formation and an enhancer for enhancing a plaque formation inhibitory effect; however, the present disclosure is not limited to these, and encompasses everything disclosed herein and recognizable to those skilled in the art.

The compositions encompassed by the present disclosure comprise a quaternary ammonium salt having a C10 to C14 (C10, C11, C12, C13, or C14) alkyl group, and preferably further comprise cetylpyridinium chloride. These compositions may be referred to as "the composition according to the present disclosure." The composition according to the present disclosure is suitable for inhibiting plaque formation, and the composition according to the present disclosure, in particular, when used for this purpose, may be referred to as "the composition for inhibiting plaque formation according to the present disclosure."

The quaternary ammonium salt having a C10 to C14 alkyl group is preferably a chloride salt or a bromide salt. The alkyl group may be linear or branched, and preferably linear.

More specifically, for example, the quaternary ammonium salt having a C10 to C14 alkyl group is preferably a compound represented by formula (1):

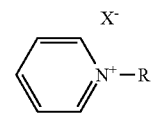

(1)

wherein R represents a C10 to C14 linear alkyl group, and X represents Cl or Br, or
a compound represented by formula (2):

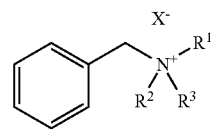

(2)

wherein $R^1$ represents a C10 to C14 linear alkyl group, $R^2$ and $R^3$ are identical or different, and each represents a C1 to C4 alkyl group, and X represents Cl or Br. The C1 to C4 alkyl group here may be linear or branched, and preferably linear. The C1 to C4 alkyl group is preferably, but is not particularly limited to, a methyl group or an ethyl group. It is particularly preferable that $R^2$ and $R^3$ each represent a methyl group. "C-digit" represents the number of carbon atoms. The compounds represented by formula (1) above may be referred to as "the compound (1)," and the compounds represented by formula (2) above may be referred to as "the compound (2)."

The compound (1) is more preferably a compound represented by formula (1a):

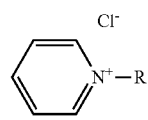

(1a)

wherein R is as defined above.

The compound (2) is more preferably a compound represented by formula (2a):

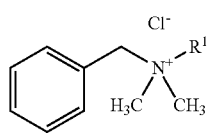

(2a)

wherein $R^1$ is as defined above.

The quaternary ammonium salts having a C10 to C14 alkyl group may be used singly or in a combination of two or more.

The composition according to the present disclosure can exhibit an excellent sterilization effect on Fusobacterium by comprising a quaternary ammonium salt having a C10 to C14 (C10, C11, C12, C13, or C14) alkyl group, and preferably by further comprising cetylpyridinium chloride, whereby an excellent effect of inhibiting plaque formation can be achieved.

For this reason, the composition according to the present disclosure can also be preferably used as a composition for sterilizing Fusobacterium.

Fusobacterium here may be any bacteria of the genus Fusobacterium. Bacteria of the genus Fusobacterium are bridge bacteria for mediating between early adherent bacteria and late adherent bacteria in plaque formation. Preferable examples of Fusobacterium include Fusobacterium nucleatum.

When the composition according to the present disclosure comprises cetylpyridinium chloride, the ratio of the quaternary ammonium salt having a C10 to C14 alkyl group to cetylpyridinium chloride is preferably, for example, 10 parts by mass of the quaternary ammonium salt to about 1 to 100 parts by mass of cetylpyridinium chloride. The upper or lower limit of this range (1 to 100 parts by mass) may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 parts by mass. For example, the range may be about 2 to 90 parts by mass or about 5 to 50 parts by mass.

The content of the quaternary ammonium salt having a C10 to C14 alkyl group in the composition according to the present disclosure is not particularly limited as long as the effects are obtained, and is, for example, about 0.005 to 0.5 mass %. The upper or lower limit of this range may be, for example, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.3, 0.31, 32, 0.33, 0.34, 0.35, 0.36, 0.37, 0.38, 0.39, 0.4, 0.41, 0.42, 0.43, 0.44, 0.45, 0.46, 0.47, 0.48, or 0.49 mass %. For example, the range may be about 0.01 to 0.3 mass %.

When the composition according to the present disclosure comprises cetylpyridinium chloride, the content of cetylpyridinium chloride is not particularly limited as long as the effects are obtained, and is, for example, about 0.01 to 0.5 mass %. The upper or lower limit of this range may be, for example, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.3, 0.31, 32, 0.33, 0.34, 0.35, 0.36, 0.37, 0.38, 0.39, 0.4, 0.41, 0.42, 0.43, 0.44, 0.45, 0.46, 0.47, 0.48, or 0.49 mass %. For example, the range may be about 0.02 to 0.3 mass % or about 0.03 to 0.1 mass %.

As stated above, the inventors found that cetylpyridinium chloride alone does not produce an efficient sterilization effect on Fusobacterium. The inventors then conducted further research and consequently found that cetylpyridinium chloride exhibits an effect of enhancing the sterilization effect of a quaternary ammonium salt having a C10 to C14 alkyl group on Fusobacterium. Accordingly, the composition according to the present disclosure, when comprising cetylpyridinium chloride, exhibits a particularly excellent sterilization effect on Fusobacterium, and can thus further produce an effect of inhibiting plaque formation.

Accordingly, the present disclosure also encompasses an enhancer comprising cetylpyridinium chloride for enhancing the effect of a Fusobacterium sterilizer of a quaternary ammonium salt having a C10 to C14 alkyl group, and an enhancer comprising cetylpyridinium chloride for enhancing the plaque formation inhibitory effect of a quaternary ammonium salt having a C10 to C14 alkyl group. The descriptions of cetylpyridinium chloride and the quaternary ammonium salt having a C10 to C14 alkyl group in terms of the composition according to the present disclosure above also apply favorably to the enhancers.

The composition according to the present disclosure is particularly suitable for use as an oral composition. Further, the oral composition is useful for sterilizing Fusobacterium and can thus be preferably used for sterilizing Fusobacterium. That is, the composition according to the present disclosure can be preferably used as an oral composition for inhibiting plaque formation or for sterilizing Fusobacterium. The composition according to the present disclosure used as an oral composition may be referred to as "the oral composition according to the present disclosure."

The oral composition according to the present disclosure can be a solid composition or a liquid composition. The oral composition can be used, for example, as a pharmaceutical products or quasi-pharmaceutical products. Although the form of the oral composition according to the present disclosure is not particularly limited, the oral composition can be made into a form (dosage form), such as an ointment, a paste, a dermatological paste, a gel, a liquid, a spray, a mouthwash, a liquid dentifrice, a toothpaste, or a gum in accordance with an ordinary method. Of these, a mouthwash, a liquid dentifrice, a toothpaste, an ointment, a paste, a liquid, and a gel are preferred.

The oral composition according to the present disclosure may further comprise one or two or more optional components that can be added to oral compositions to the extent that the effects are not impaired.

For example, surfactants, such as nonionic surfactants, anionic surfactants, and ampholytic surfactants, may be added. Specific examples of nonionic surfactants include sugar fatty acid esters, such as sucrose fatty acid esters, maltose fatty acid esters, and lactose fatty acid esters; fatty acid alkanolamides; sorbitan fatty acid esters; fatty acid monoglyceride; polyoxyethylene alkyl ethers with a polyoxyethylene addition factor of 8 to 10, and 13 to 15 carbon atoms in the alkyl group; polyoxyethylene alkyl phenyl ethers with a polyoxyethylene addition factor of 10 to 18, and 9 carbon atoms in the alkyl group; diethyl sebacate; polyoxyethylene hydrogenated castor oil; and fatty acid polyoxyethylene sorbitan. Examples of anionic surfactants include sulfates, such as sodium lauryl sulfate and sodium polyoxyethylene lauryl ether sulfate; sulfosuccinates, such as sodium lauryl sulfosuccinate and sodium polyoxyethylene lauryl ether sulfosuccinate; acyl amino acid salts, such as sodium cocoyl sarcosine and sodium lauroyl methylalanine; and sodium cocoyl methyl taurine. Examples of ampholytic surfactants include betaine acetate activators, such as betaine lauryl dimethylamino acetate and coconut oil fatty acid amide propyldimethylamino acetate betaine; imidazoline activators, such as sodium N-cocoyl-N-carboxymethyl-N-hydroxyethylethylenediamine; and amino acid activators, such as N-lauryl diaminoethyl glycine. These surfactants can be added singly or in a combination of two or more. The amount of the surfactant added is typically 0.1 to 5 mass % based on the total amount of the composition.

Examples of flavoring agents that can be added include menthol, carboxylic acid, anethole, eugenol, methyl salicylate, limonene, ocimene, n-decyl alcohol, citronellal, α-terpineol, methyl acetate, citronellyl acetate, methyleugenol, cineol, linalool, ethyl linalool, thymol, spearmint oil, peppermint oil, lemon oil, orange oil, sage oil, rosemary oil, cinnamon oil, beefsteak plant oil, wintergreen oil, clove oil, eucalyptus oil, pimento oil, d-camphor, d-borneol, fennel oil, cinnamon oil, cinnamaldehyde, mint oil, and vanillin. These flavoring agents can be used singly or in a combination of two or more, and the amount of the flavoring agents added may be, for example, 0.001 to 1.5 mass % based on the total amount of the composition.

Examples of sweeteners include saccharin sodium, acesulfame potassium, stevioside, neohesperidin dihydrochalcone, perillatin, thaumatin, aspartylphenylalanine methyl ester, and p-methoxycinnamic aldehyde. The amount of the sweeteners added may be, for example, 0.01 to 1 mass % based on the total amount of the composition.

Further, wetting agents such as sorbit, ethylene glycol, propylene glycol, glycerol, 1,3-butylene glycol, polypropylene glycol, xylitol, maltitol, lactitol, and polyoxyethylene glycol can be added singly, or in a combination of two or more.

Preservatives such as the following can be added: parabens, such as methylparaben, ethylparaben, propylparaben, and butylparaben, sodium benzoate, phenoxyethanol, and alkyldiaminoethylglycine hydrochloride.

Colorants such as the following can be added: legally permitted pigments such as blue No. 1, yellow No. 4, red No. 202, and green No. 3; mineral-based pigments such as ultramarine, enhanced ultramarine, and ferric hexacyanoferrate; and titanium oxide.

pH Adjusters such as the following can be added: citric acid, phosphoric acid, malic acid, pyrophosphoric acid, lactic acid, tartaric acid, glycerophosphoric acid, acetic acid, nitric acid, chemically possible salts thereof, and sodium hydroxide. These pH adjusters can be added singly or in a combination of two or more such that the composition has a pH of 4 to 8, and preferably 5 to 7. The amount of the pH adjuster may be, for example, 0.01 to 2 wt %.

In addition to a quaternary ammonium salt having a C10 to C14 alkyl group and cetylpyridinium chloride, the oral composition according to the present disclosure may further comprise the following medicinal ingredients singly or in a combination of two or more: vitamin E, such as dl-α-tocopherol acetate, tocopherol succinate, or tocopherol nicotinate; ampholytic sterilizers, such as dodecyl diamino ethyl glycine; nonionic sterilizers, such as triclosan, isopropyl methylphenol, hinokitiol; anionic sterilizer, such as sodium lauroyl sarcosine; cationic sterilizer, such as chlorhexidine hydrochloride and benzethonium chloride; enzymes, such as dextranase, amylase, protease, mutanase, lysozyme, and lytic enzymes; alkali metal monofluorophosphates, such as sodium monofluorophosphate and potassium monofluorophosphate; fluorides, such as sodium fluoride and stannous fluoride; tranexamic acid, epsilon aminocaproic acid, aluminum chlorohydroxy allantoin, dihydrocholesterol, glycyrrhetinic acid, glycyrrhizic acid, sodium copper chlorophyllin, glycerophosphate, chlorophyll, sodium chloride, caropeptide, allantoin, carbazochrome, hinokitiol, potassium nitrate, and palatinit.

Bases such as the following can also be added: alcohols, silicon, apatite, white Vaseline, paraffin, liquid paraffin, microcrystalline wax, squalane, and Plastibase.

The oral composition according to the present disclosure can be prepared by known methods or methods obvious from the known methods. For example, the oral composition according to the present disclosure can be prepared by appropriately mixing a quaternary ammonium salt having a C10 to C14 alkyl group and preferably additionally cetylpyridinium chloride, and optionally other components etc.

The subjects to which the oral composition according to the present disclosure is applied are not particularly limited. For example, humans and nonhuman mammals are preferred. Preferable examples of nonhuman mammals include livestock and pets. More specific examples include dogs, cats, mice, rats, horses, cattle, sheep, and monkeys. As stated above, the oral composition according to the present disclosure comprises a quaternary ammonium salt having a C10 to C14 alkyl group, and preferably further comprises cetylpyridinium chloride, enabling efficient sterilization of Fusobacterium, i.e., bridge bacteria. It is thus particularly suitable to apply the oral composition according to the present disclosure to the oral cavity of a subject in which plaque is not formed or in which plaque is being formed (i.e., late adherent bacteria is not adhered).

The description of the oral composition according to the present disclosure above is also directly applicable to the composition according to the present disclosure that is not used as an oral composition (for example, when used for denture cleaning).

In the present specification, the terms "comprising" and "containing" also include consisting essentially of and consisting of. The present disclosure encompasses any combination of the elements described in the present specification.

The various characteristics (e.g., properties, structures, functions) described in each embodiment of the present disclosure can be combined in any way in specifying the subject matter encompassed in the present disclosure. Specifically, the present disclosure encompasses all subject matter formed by any possible combination of the characteristics described in the present specification.

EXAMPLES

The embodiments of the present disclosure are described with reference to examples in more detail below. However, the embodiments of the present disclosure are not limited to the following examples.

Study of Sterilization Effect of Quaternary Ammonium Salt on Fusobacterium

The alkylpyridinium chlorides and benzyl alkyl dimethyl ammonium chlorides shown below were dissolved in water such that each component had each concentration (0.01%, 0.02%, 0.03%, 0.04%, 0.05%, 0.07%, or 0.10%), and the resulting products were used as sterilizer liquids. In the sterilizer liquids, the components were used singly or in combination. The concentration (%) of an alkylpyridinium chloride in the sterilizer liquids is expressed as w/v %; however, since the solvent is water, and the concentrations are relatively low, the value is almost the same as the value expressed as mass % (w/w %) and can be approximated.

Octylpyridinium chloride (OPC): R=(CH$_2$)$_7$CH$_3$ in the following formula

Dodecylpyridnium chloride (DPC): R=(CH$_2$)$_{11}$CH$_3$ in the following formula Cetylpyridinium chloride (CPC): R=(CH$_2$)$_{15}$CH$_3$ in the following formula

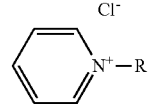

Benzyl dodecyl dimethyl ammonium chloride (BKC12): $R^1=C_{12}H_{25}$ in the following formula Benzyl tetradecyl dimethyl ammonium chloride (BKC14): $R^1=C_{14}H_{23}$ in the following formula Benzyl hexadecyl dimethyl ammonium chloride (BKC16): $R^1=C_{16}H_{33}$ in the following formula

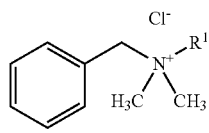

For test bacteria, the following two subspecies of Fusobacterium were used.

Bacteria 1: *Fusobacterium nucleatum* subsp. *nucleatum* ATCC23726

Bacteria 2: *Fusobacterium nucleatum* subsp. *nucleatum* ATCC25586

The test bacteria were individually inoculated into 10 ml of GAM bouillon medium (Nissui Pharmaceutical Co., Ltd.) and incubated anaerobically at 37° C. for 2 days. The resulting culture media were used as test bacteria liquids.

The sterilizer liquids (200 μl) at different concentrations were each mixed with the test bacteria liquids (200 μl). Thirty seconds after the mixing, 100 μl of the mixture was collected, and 900 μl of drug inactivation PBS in which soy lecithin and Tween 80 were added to a final concentration of 0.07% and 0.5%, respectively, to phosphate-buffered saline (PBS) was added (the mixture was diluted 10-fold) to inactivate the sterilization properties of the sterilizers. Each mixture was serially diluted $10^1$- to $10^7$-fold with the drug inactivation PBS (serially diluted mixers).

100 μl each of the prepared serially diluted mixers was smeared on sheep blood agar media for CDC anaerobes (Becton, Dickinson and Company), cultured anaerobically at 37° C. for 3 days, and the number of viable bacteria was counted.

Figure 2:
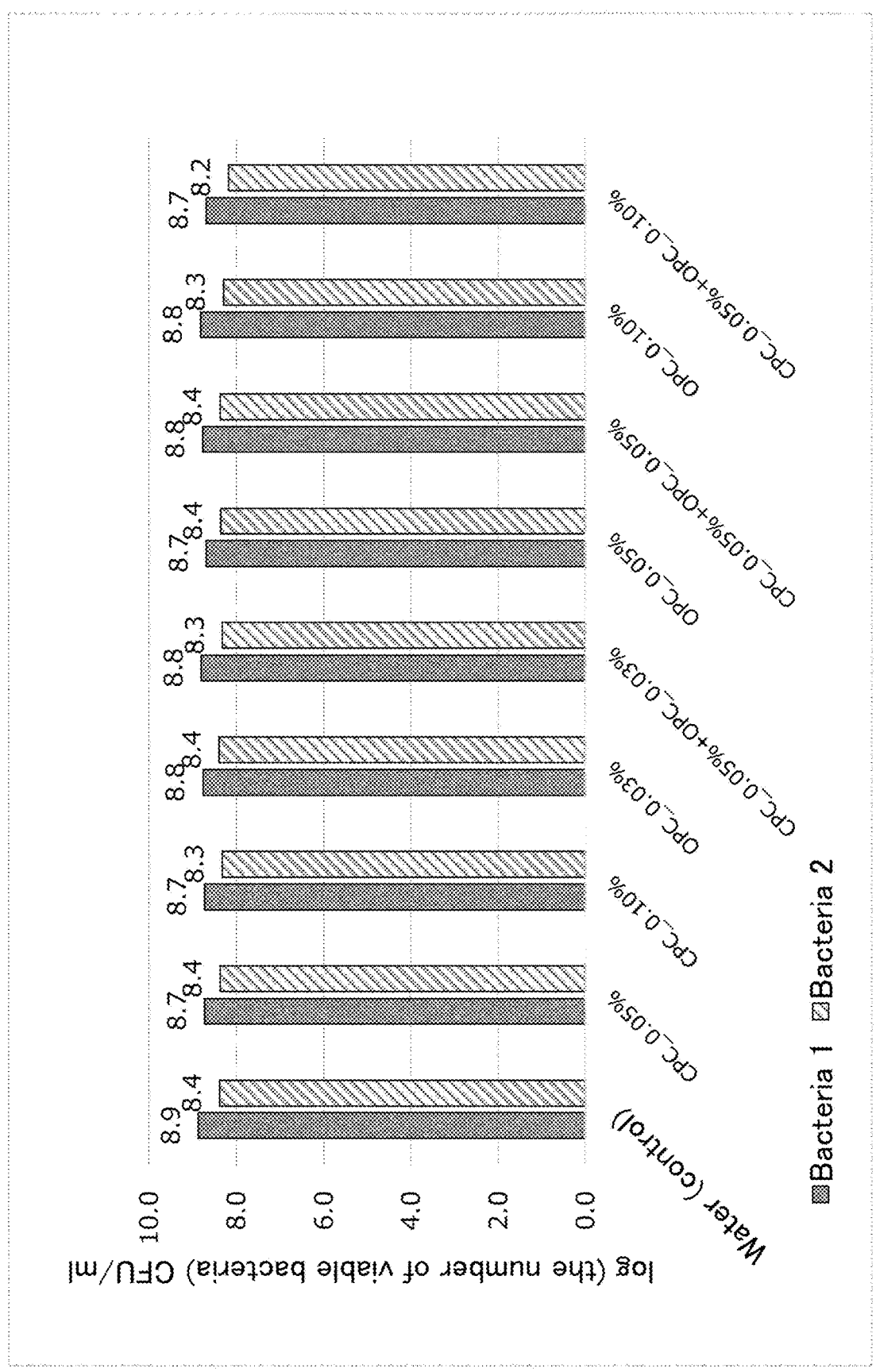
FIG. 2 is a graph showing study results of the sterilization effect of a quaternary ammonium salt having a C10 to C14 alkyl group (CPC and/or DPC) on Fusobacterium.
Figure 3:
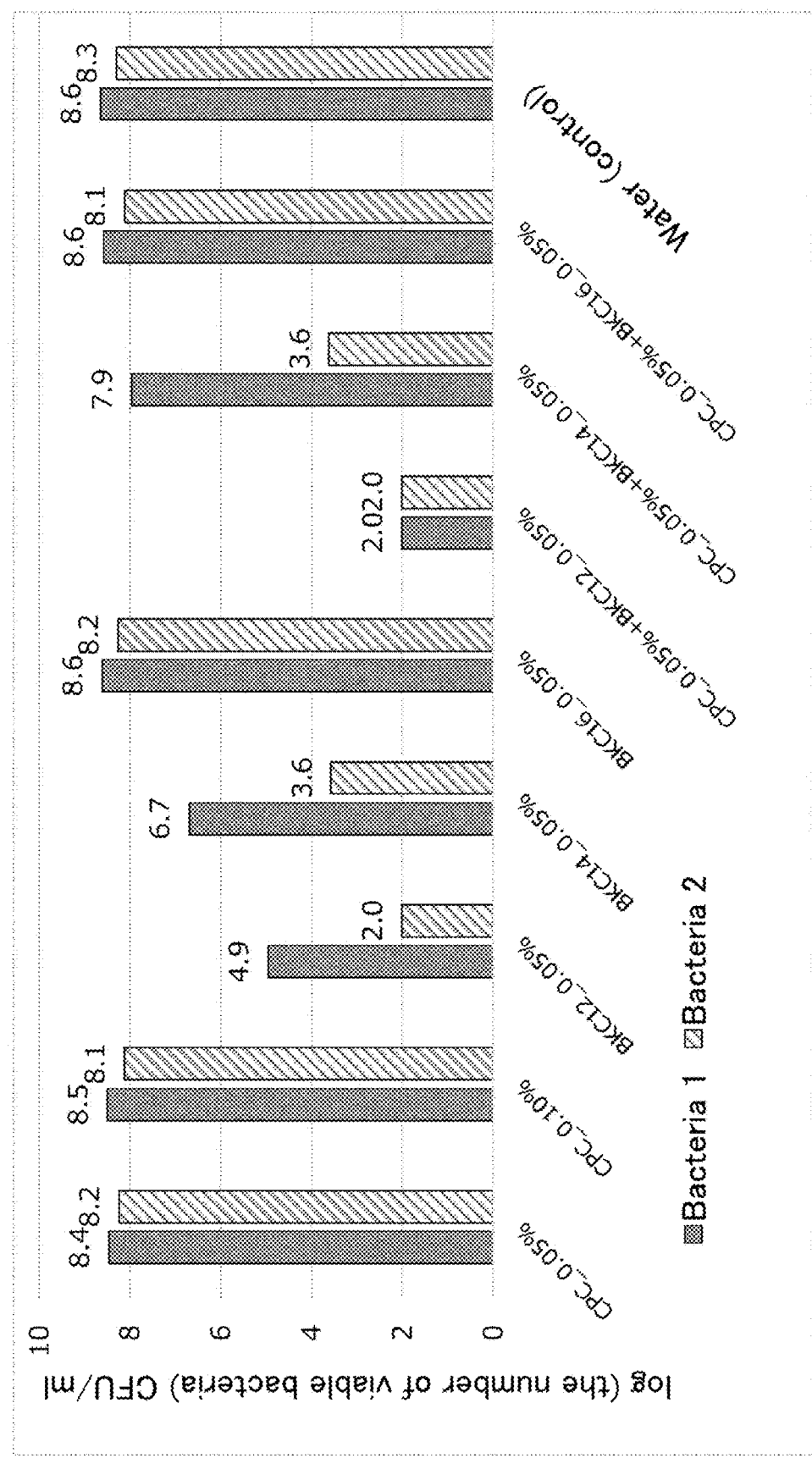
FIG. 3 is a graph showing study results of the sterilization effect of a quaternary ammonium salt having a C10 to C14 alkyl group (CPC and/or BKC12, BKC14, or BKC16) on Fusobacterium.

FIGS. 1, 2, and 3 show the results. In the graphs of these figures, the vertical axis represents log (the number of viable bacteria) CFU/ml, with the detection limit of this value being 2. (A value of less than 2 indicates that sterilization was achieved to less than 100 CFU.)

The concentrations of CPC, DPC, OPC, BKC12, BKC14, and BKC16 in these figures and the following figures represent the concentrations of these components prepared as sterilizer liquids.

The results indicated that that CPC and OPC did not show a sterilization effect on Fusobacterium, while DPC showed a sterilization effect on Fusobacterium even at a relatively low concentration. The results also indicated that although CPC alone did not show sterilization effect on Fusobacterium, CPC, when combined with DPC, enhanced the sterilization effect of DPC on Fusobacterium.

Figure 4A:
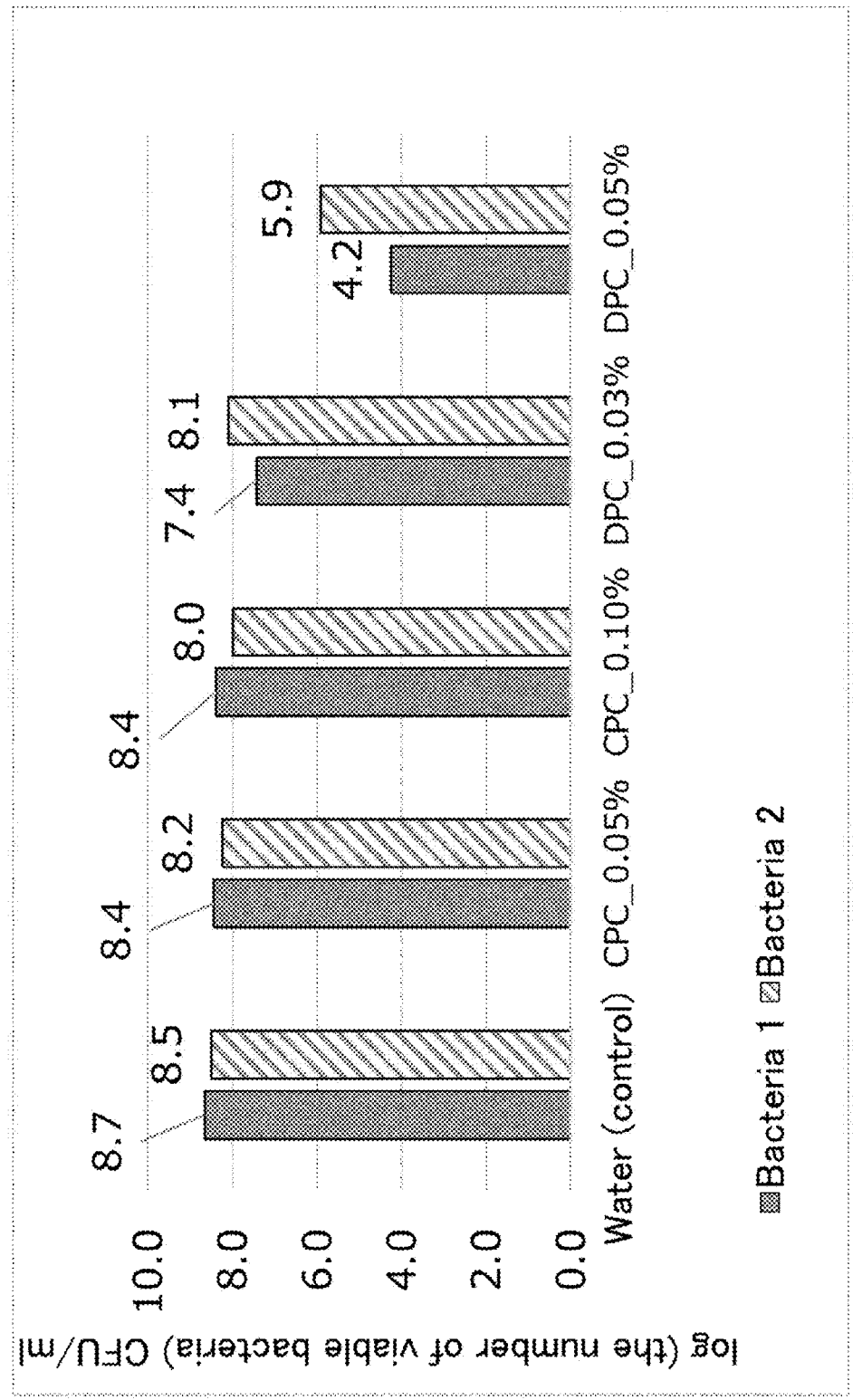
FIG. 4a is a graph showing study results of the sterilization effect of alkylpyridinium chloride (CPC and DPC) on Fusobacterium.
Figure 4B:
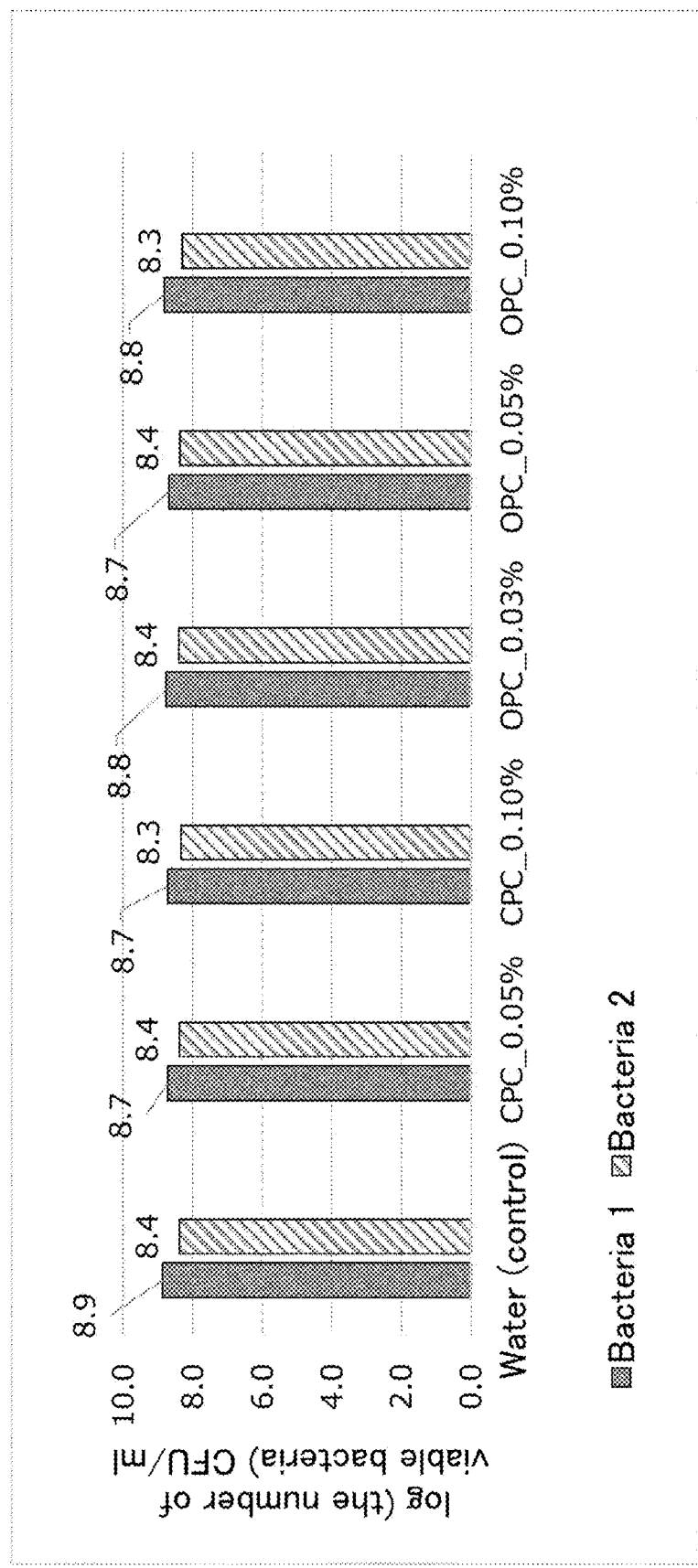
FIG. 4b is a graph showing study results of the sterilization effect of alkylpyridinium chloride (CPC and OPC) on Fusobacterium.

The results obtained by using CPC, DPC, or CPC singly are extracted from FIGS. 1 and 2 and shown in FIGS. 4a and 4b.

Similarly, the results indicated that BKC16 did not show a sterilization effect on Fusobacterium, while BKC14 or BKC12 showed a sterilization effect on Fusobacterium even at a relatively low concentration. The results also indicted that although CPC alone did not show a sterilization effect on Fusobacterium, CPC, when combined with BKC14 or BKC12, enhanced the sterilization effect of BKC14 or BKC12 on Fusobacterium.

Study of Sterilization Effect of Compositions Comprising a Quaternary Ammonium Salt and CPC on Fusobacterium Liquid compositions comprising a quaternary ammonium salt and CPC at each concentration were prepared by mixing, in addition to these components, water, a solvent (glycerol), a flavoring agent, a preservative, and a solubilizer (polyoxyethylene hydrogenated castor oil).

Figure 5:
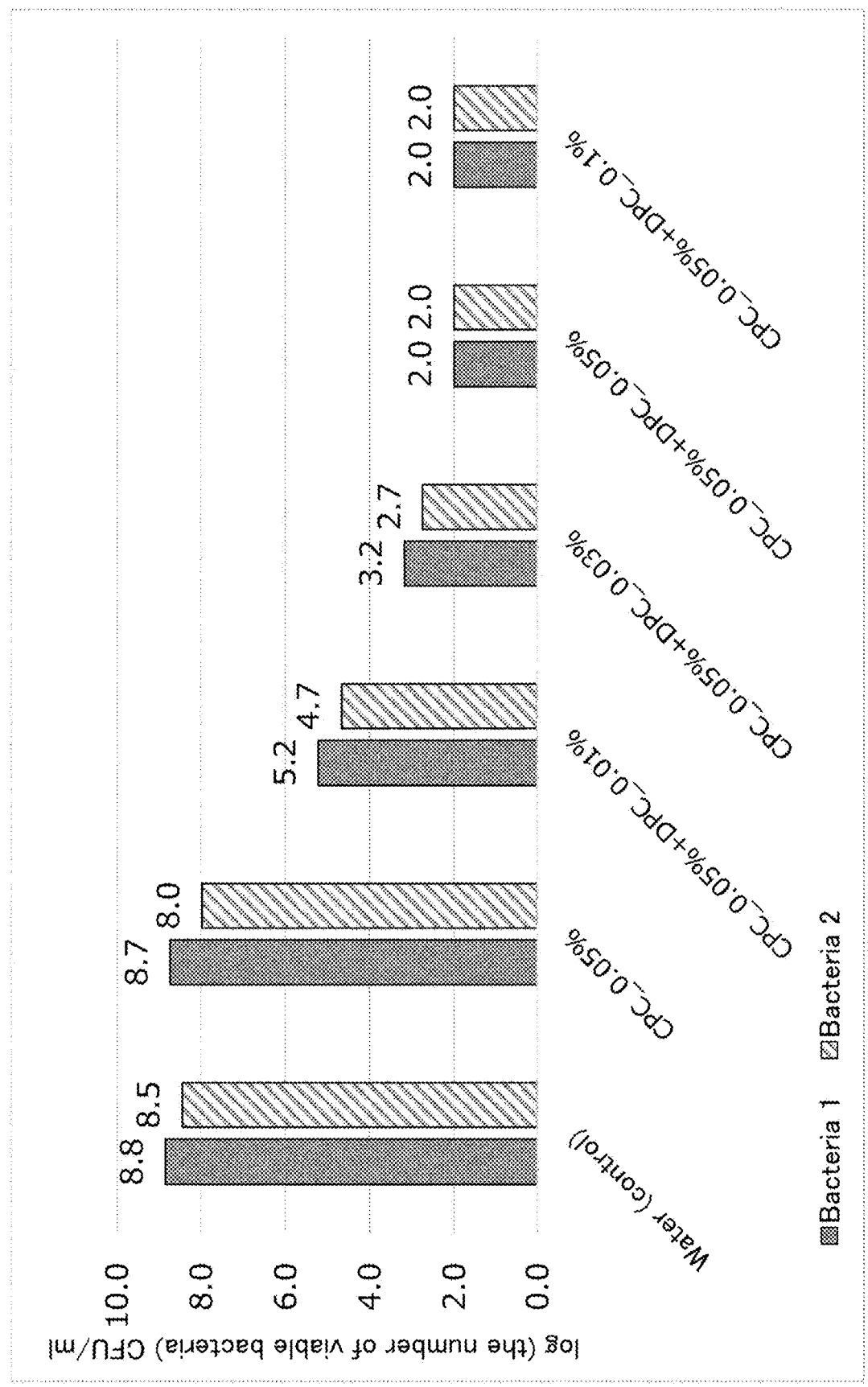
FIG. 5 is a graph showing study results of the sterilization effect of a composition comprising CPC and/or DPC on Fusobacterium.

The sterilization effect of these liquid compositions was examined in the same manner as above. FIG. 5 shows the results.

Figure 6:
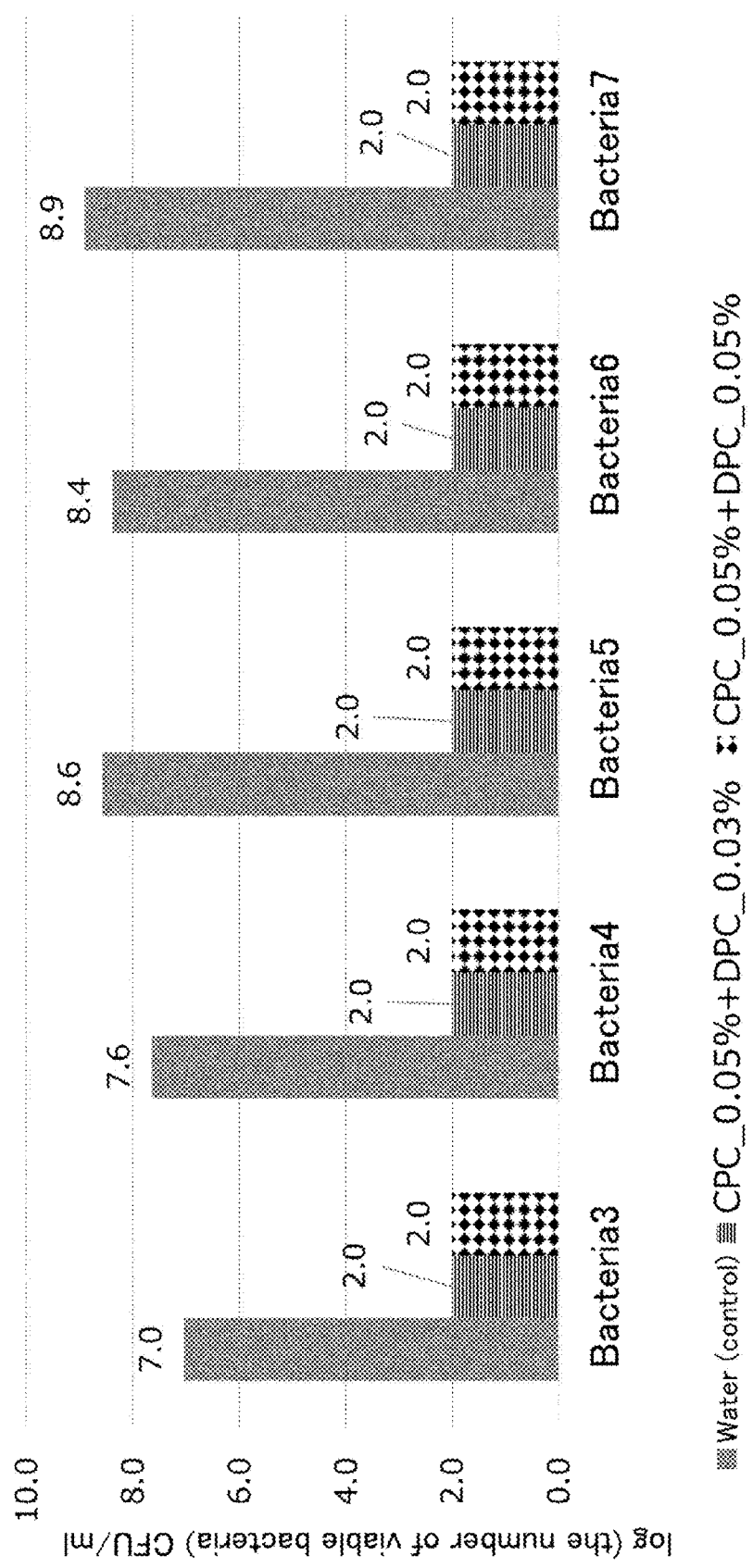
FIG. 6 is a graph showing study results of the sterilization effect of a composition comprising CPC and/or DPC on Fusobacterium.

The sterilization effect of the liquid compositions on further additional subspecies of Fusobacterium were also examined in the same manner as above. Specifically, instead of bacteria 1 and bacteria 2, the following bacteria 3, 4, 5, 6, and 7 were used to examine the sterilization effect. FIG. 6 shows the results.

Bacteria 3: Fusobacterium necrophorum subsp. *necrophorum* ATCC25286

Bacteria 4: *Fusobacterium nucleatum* subsp. *polymorphum* ATCC10953

Bacteria 5: *Fusobacterium nucleatum* subsp. *fusiforme* ATCC51190

Bacteria 6: *Fusobacterium nucleatum* subsp. *vincentii* ATCC49256

Bacteria 7: *Fusobacterium nucleatum* subsp. *animalis* ATCC51191

The results confirmed that the examined compositions comprising DPC and CPC sterilized Fusobacterium to equal to or below the detection limit.

Figure 7A:
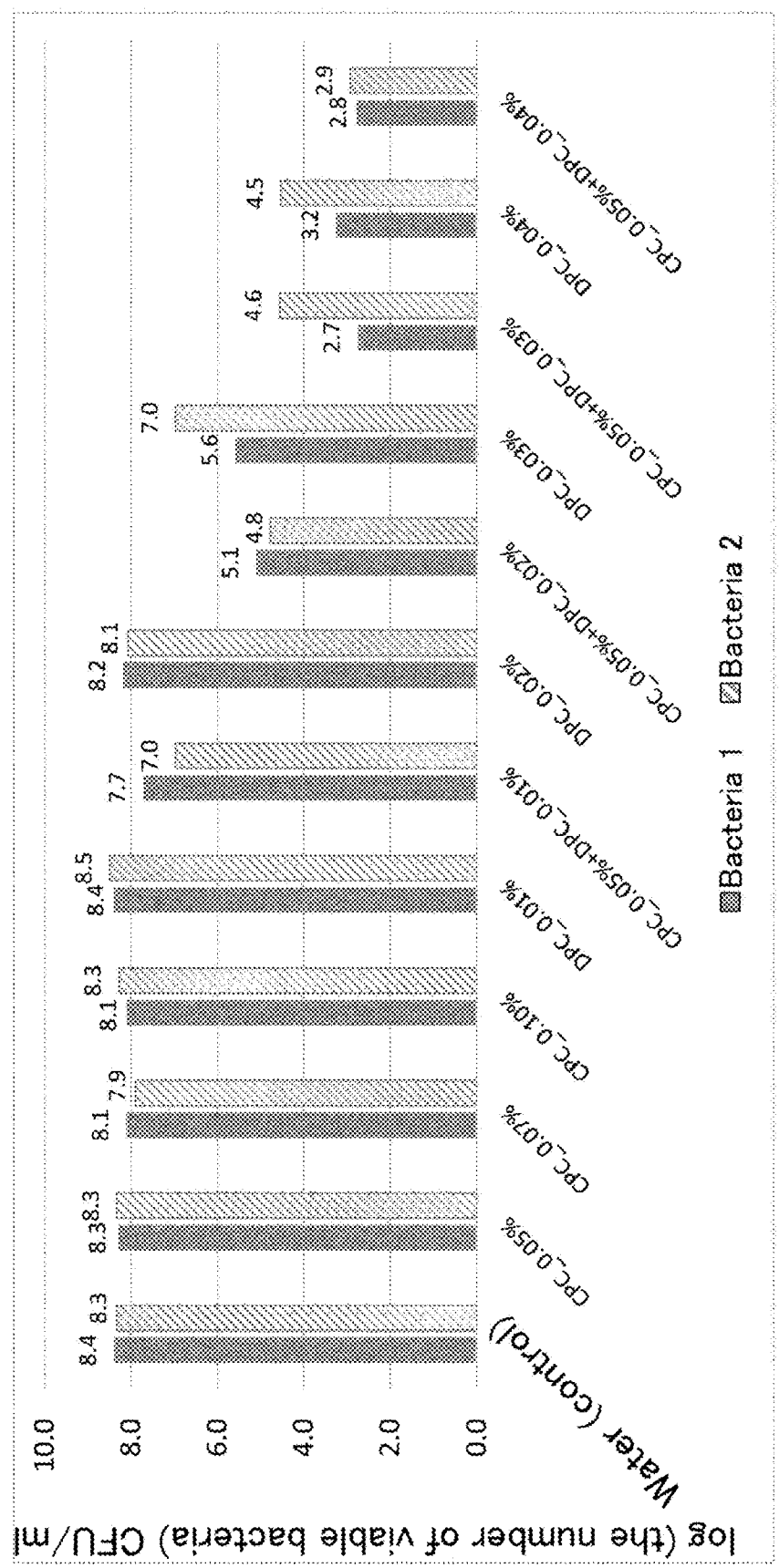
FIG. 7a is a graph showing study results of the sterilization effect of alkylpyridinium chloride (CPC and DPC) on Fusobacterium.
Figure 7B:
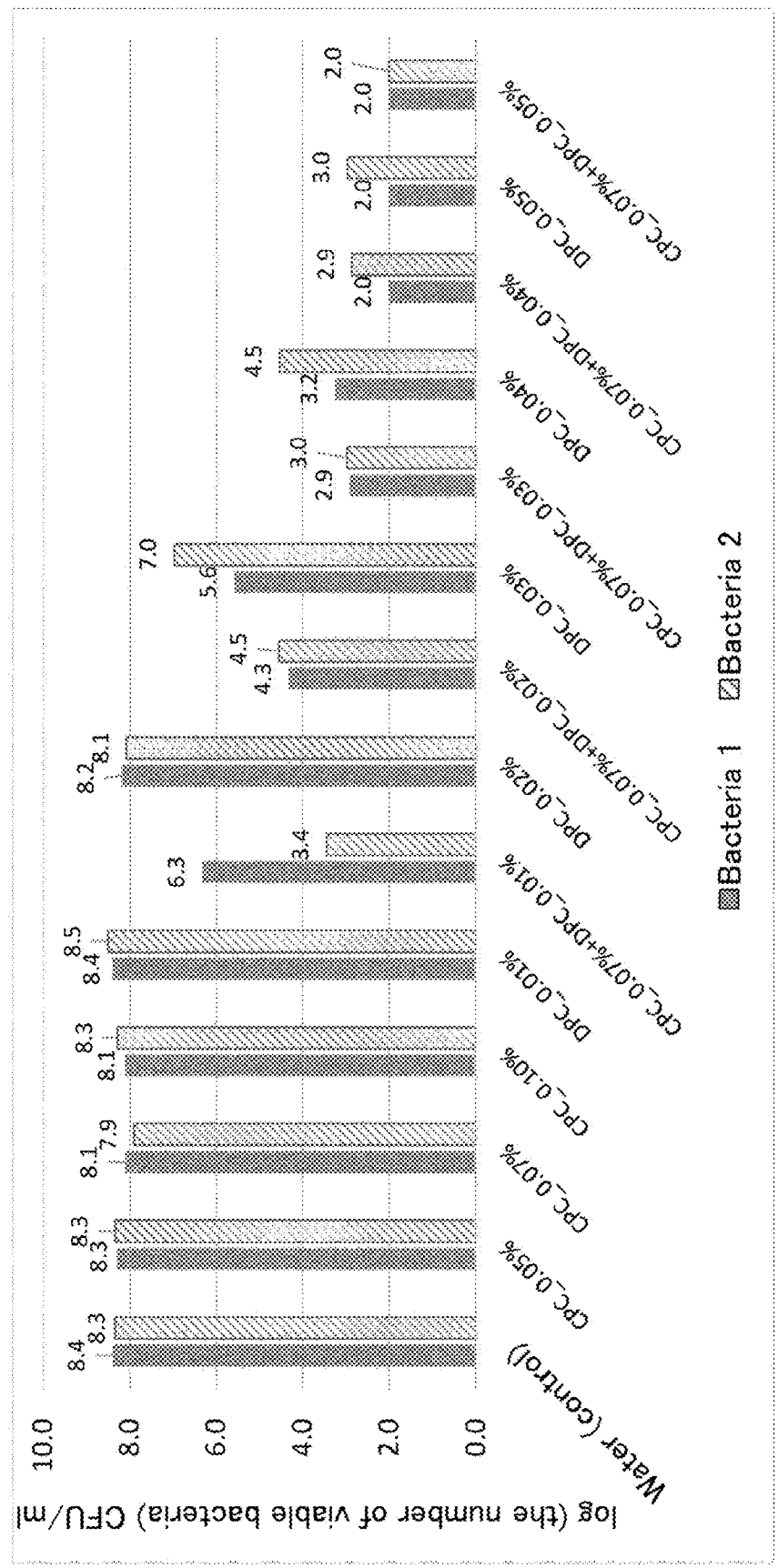
FIG. 7b is a graph showing study results of the sterilization effect of alkylpyridinium chloride (CPC and DPC) on Fusobacterium.

Additionally, the sterilization effect on Fusobacterium in terms of the alkylpyridinium chlorides at each concentration when used singly or compositions comprising the alkylpyridinium chlorides at each concentration in combination, was examined again in the same manner as above. FIGS. 7a and 7b show the results.

Formulation examples are shown below. In the following formulation examples, the values for each component are expressed as "mass %"

Formulation Examples

Liquid/Gel

TABLE 1

| | Formulation example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Sodium lauryl sulfate | | 0.4 | | | | | | 0.2 | 0.1 | | | |
| Sodium olefin (C14-16) sulfonate | | | | | | | 0.1 | | | | | |
| Sodium N-myristoyl-L-glutamate | | | 0.1 | | | | | | | | | |
| Sodium lauroyl sarcosine | | | | | | 0.1 | | | | | | |
| Polyethylene glycol myristate (15 E.O.) | | | | | | 0.1 | | | | | | |

TABLE 1-continued

| | Formulation example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Propylene glycol alginate | | | | | | | 0.1 | | | | | |
| Polyoxyethylene hydrogenated castor oil (60 E.O.) | 0.3 | | 0.5 | 0.5 | | 0.3 | 1.5 | | 1 | 0.5 | 0.4 | 0.2 |
| Sucrose stearic acid ester | | | | | 0.05 | | | | | | | |
| Isodecyl galactoside | | 0.08 | | | | | | | | | | |
| Concentrated glycerol | 10 | 18 | | 3 | 15 | 2 | 10 | | 10 | 10 | 10 | 5 |
| Sorbitol | | | 20 | | | | | 35 | | | | |
| Erythritol | | | 5 | | 15 | | | | | | | |
| Xylitol | | | | 4 | | | 1 | | | 1 | | |
| Reduced palatinose | | | | | | 3 | | | 1 | | | |
| Propylene glycol | 5 | 8 | 2 | | | 2 | 0.5 | 5 | 5 | 5 | | |
| Ethyl alcohol | | | | 10 | 8 | 4 | 2 | | 10 | 5 | | 6 |
| Carrageenan | | | | | | | 0.05 | | | | | |
| Cetylpyridinium chloride | 0.05 | 0.03 | 0.05 | 0.05 | 0.03 | 0.05 | 0.05 | 0.05 | 0.05 | 0.05 | 0.07 | 0.07 |
| Benzalkonium chloride | 0.05 | 0.01 | 0.03 | 0.03 | 0.03 | 0.03 | 0.03 | 0.01 | 0.01 | 0.03 | | |
| Benzethonium chloride | | | | | 0.01 | | | | | | | |
| Laurylpyridinium chloride | | 0.01 | 0.05 | 0.05 | 0.01 | | 0.05 | 0.05 | 0.05 | 0.05 | 0.01 | 0.05 |
| Isopropyl methylphenol | | | 0.1 | | | | 0.01 | | | 0.05 | | |
| Allantoin chlorohydroxy aluminum | | | | 0.1 | | | | | | | | |
| Dipotassium glycyrrhizate | | 0.03 | | | | | | | | 0.02 | | |
| Tocopherol acetate | | | | | | | | | | 0.05 | | |
| Allantoin | | | | | | | | | | 0.05 | | |
| Sodium fluoride | | | | | | | | | 0.1 | | | |
| β-glycyrrhetinic acid | | | | 0.03 | | | | | | | | |
| Tranexamic acid | | | | | | | | | 0.05 | | | |
| Citric acid | 0.01 | | | | 0.01 | 0.05 | | 0.0 | 0.01 | | 0.03 | 0.01 |
| Sodium citrate | | | | | | 0.3 | | | | | | |
| Trisodium citrate | 0.1 | | | | 0.1 | | | 0.1 | 0.1 | | 0.1 | 0.1 |
| Sodium dihydrogen phosphate | | | | | | | | | | 0.1 | | |
| Sodium monohydrogen phosphate | | | | | | | | | | 0.01 | | |
| Sodium hydroxide | | | | 0.07 | 0.1 | | | | | | | |
| Alanine | | | | | | | 0.5 | | | | | |
| Sucralose | | 0.001 | 0.006 | | | | 0.03 | | | | | |
| Sodium saccharin | 0.01 | | 0.3 | | | | | | | 0.01 | 0.01 | 0.02 |
| Stevioside | | 0.1 | | | 0.005 | | | | | | | |
| Acesulfame potassium | | | | 0.01 | | | | | 0.03 | | | |
| Flavoring composition | 0.1 | 0.1 | 0.1 | 0.1 | 0.1 | 0.1 | 0.1 | 0.1 | 0.1 | 0.1 | 0.1 | 0.2 |
| Purified water | Bal. | Bal. | Bal. | Bal. | Bal. | Bal. | Bal. | Bal. | Bal. | Bal | Bal. | Bal. |
| Total | 100 | 100 | 100 | 100 | 100 | 100 | 100 | 100 | 100 | 100 | 100 | 100 |

Toothpaste

TABLE 2

| | Formulation example | | | | | | |
|---|---|---|---|---|---|---|---|
| | 13 | 14 | 15 | 16 | 17 | 18 | 19 |
| Abrasive silica | 20 | | 15 | 13 | 12 | 8 | |
| Thickening silica | 5 | | 10 | | 2 | 4 | |
| Calcium hydrogen phosphate for toothpaste | | 25 | 5 | | | | |
| Anhydrous dibasic calcium phosphate | | 5 | | 10 | | | 10 |
| Calcium carbonate | | | | | | | 20 |
| Sodium carboxy-methyl cellulose | | | 0.3 | 1 | 1.5 | 1 | 1 |
| Sodium lauroyl sarcosine | | | 0.1 | | | | |
| Xanthan gum | | 1.5 | | | | 0.2 | |
| Carrageenan | 0.5 | | | | | | 0.2 |
| Cellulose granules | | | | 5 | | | |
| Sodium alginate | | | 0.3 | | | | |
| Concentrated glycerol | 10 | | | | 5 | | 20 |
| Propylene glycol | | 5 | | | 3 | | |
| Polyethylene glycol 400 | | | 5 | | | | |
| Polyethylene glycol 600 | | | | | | 1 | |
| Sorbitol | | 20 | 25 | 20 | 20 | 25 | |
| Xylitol | | | | 0.1 | 10 | | |
| Erythritol | | | | | | 35 | |
| Sodium lauryl sulfate | 3.5 | | | 1 | 1.5 | | 2.5 |
| Lauroyl methyl taurine | | | | | 0.3 | | |
| Cocamidopropyl betaine | | | | | | 1 | |
| Polyoxyethylene (60) hydrogenated castor oil | 1 | 2 | | 0.5 | | | |
| Sodium fluoride | 0.2 | | | | 0.3 | 0.2 | |
| Sodium monofluorophosphate | | 1.1 | | | | | 0.7 |
| Cetylpyridinium chloride | 0.05 | 0.05 | 0.05 | 0.1 | 0.05 | 0.05 | 0.05 |
| Benzalkonium chloride | 0.03 | 0.03 | 0.03 | 0.01 | 0.05 | 0.03 | 0.01 |
| Benzethonium chloride | | | | | | 0.01 | |

TABLE 2-continued

| | Formulation example | | | | | | |
|---|---|---|---|---|---|---|---|
| | 13 | 14 | 15 | 16 | 17 | 18 | 19 |
| Laurylpyridinium chloride | 0.1 | | 0.2 | 0.05 | 0.03 | 0.4 | 0.2 |
| Isopropyl methylphenol | 0.03 | | | 0.1 | | | 0.05 |
| Dipotassium glycyrrhizate | | 0.02 | | | | | |
| β-glycyrrhetinic acid | 0.1 | | | | | | |
| Tocopherol acetate | 0.05 | | | | | | |
| Allantoin | 0.05 | | | | | | |
| Tranexamic acid | | 0.05 | | | | | |
| Pyrrolidonecarboxylic acid | 5 | | | 3 | | | 5 |
| Phytic acid | | | | | 0.3 | | |
| DL-malic acid | | | | | 0.1 | | |
| Sodium tripolyphosphate | | | | | 0.5 | | |
| Sodium hydroxide | | | | | | 0.1 | |
| Titanium oxide | 0.5 | 0.8 | 0.2 | | 0.3 | | |
| Sodium saccharin | 0.3 | 0.05 | 0.1 | | 0.05 | | 0.1 |
| Aspartame | | | | | 0.02 | 0.03 | |
| Acesulfame potassium | | | | 0.05 | 0.01 | 0.02 | |
| Flavoring composition | 1 | 1 | 1 | 1 | 1 | 1 | 1 |
| Purified water | Bal. | Bal. | Bal. | Bal. | Bal. | Bal. | Bal. |
| Total | 100 | 100 | 100 | 100 | 100 | 100 | 100 |

The invention claimed is:

1. A method for sterilizing *Fusobacterium*, the method comprising:

applying a composition comprising a cetylpyridinium chloride and a dodecylpyridinium chloride, wherein a concentration of the cetylpyridinium chloride in the composition is 0.05 to 0.07 mass %, and a concentration of the dodecylpyridinium chloride in the composition is 0.01 to 0.2 mass %.

2. The method for sterilizing *Fusobacterium* according to claim 1, wherein the concentration of the dodecylpyridinium chloride in the composition is 0.01 to 0.1 mass %.

3. The method for sterilizing *Fusobacterium* according to claim 1, wherein the method further comprises:

applying the composition to a subject in need thereof.

4. The method for sterilizing *Fusobacterium* according to claim 3, wherein the method further comprises:

applying the composition to an oral cavity of the subject in need thereof.

* * * * *